United States Patent [19]

Mintzer et al.

[11] Patent Number: 4,712,140
[45] Date of Patent: Dec. 8, 1987

[54] IMAGE REDUCTION METHOD

[75] Inventors: Frederick C. Mintzer, Shrub Oak; Karen L. Anderson, Peekskill, both of N.Y.

[73] Assignee: International Business Machines Corporation, Armonk, N.Y.

[21] Appl. No.: 840,627

[22] Filed: Mar. 17, 1986

Related U.S. Application Data

[63] Continuation of Ser. No. 567,310, Dec. 30, 1983, abandoned.

[51] Int. Cl.⁴ .............................................. H04N 7/18
[52] U.S. Cl. .................................. 358/260; 340/731; 382/47
[58] Field of Search .................. 358/260, 133, 138; 340/728, 731, 750; 382/47

[56] References Cited

U.S. PATENT DOCUMENTS

| | | | |
|---|---|---|---|
| 3,289,164 | 11/1966 | Rabinow | 382/47 |
| 4,280,143 | 7/1981 | Judd | 358/26 |
| 4,468,688 | 8/1984 | Gabriel et al. | 358/22 |
| 4,528,693 | 7/1985 | Pearson et al. | 382/47 |

FOREIGN PATENT DOCUMENTS 59-167772  9/1984  Japan .

OTHER PUBLICATIONS

Boberg—Regridding Method—IBM Tech Discl. Bull., vol. 13, #8, Jan. 1971, pp. 2291-2293.
Liao—Table Look-up Realization of Digital Filtering—Xerox Discl. Jour., vol. 5, #1-Jan./Feb. 1980, p. 115.

Primary Examiner—Joseph A. Orsino, Jr.
Attorney, Agent, or Firm—Thomas P. Dowd

[57] ABSTRACT

A binary image is reduced in size by a method including the steps of: storing the image in bit sequence; dividing the image into transposable blocks; transposing by look up table, for each block having any nonzero data, each group of 6 bits along a first axis to a group of 5 bits; transposing by look up table, for each block having any nonzero data, each group of 6 bits along a second axis to a group of 5 bits; storing said transposed blocks.

20 Claims, 4 Drawing Figures

Reduction of 6 x 6 Bit Blocks

The image is divided into 6 x 6 bit blocks. A 5 x 6 bit block is obtained by using the algorithm on the left to shorten each row and transposing the resulting image. The process is repeated to yield the final 5 x 5 bit block.

Reduction of 6 x 6 Bit Blocks

The image is divided into 6 x 6 bit blocks. A 5 x 6 bit block is obtained by using the algorithm on the left to shorten each row and transposing the resulting image. The process is repeated to yield the final 5 x 5 bit block.

IMAGE REDUCTION METHOD

RELATED APPLICATION

This is a continuation application based on our earlier co-pending application Ser. No. 06/567,310, filed Dec. 30, 1983, now abandoned.

BACKGROUND OF THE INVENTION

1. Field of the Invention

The present invention relates to digital image processing methods and more particularly to methods for image reduction.

2. Description of the Prior Art

Although there are many image manipulation methods in the prior art, none is known which teaches or suggests the method of the present invention.

SUMMARY OF THE INVENTION

Therefore, it is an object of the present invention to reduce an image by a predetermined ratio comprising the steps of: storing said image in bit sequence; dividing said image into transposable blocks; transposing for each block having any two bits different, each string of n bits along a first axis to a string of m bits where m is less than n; transposing for each block having any two bits different, each string of i bits along a second axis to a string of j bits where j is less than i; storing said transposed blocks.

Accordingly, the method of the present invention reduces an image by a predetermined ratio by the steps of: storing the image in bit sequence; dividing the image into transposable blocks; transposing for each block having any nonzero data, each string of 6 bits along a first axis to a string of 5 bits; transposing for each block having any nonzero data, each string of 6 bits along a second axis to a string of 5 bits; storing each of the transposed blocks to form the reduced image.

The foregoing and other objects, features and advantages of the invention will be apparent from the more particular description of the preferred embodiment of the invention, as illustrated in the accompanying drawing.

BRIEF DESCRIPTION OF THE DRAWING

In the drawing, like elements are designated with similar reference numbers, and identical elements in different specific embodiments are designated by identical reference numbers.

DESCRIPTION OF PREFERRED EMBODIMENTS OF THE INVENTION

Figure 1:
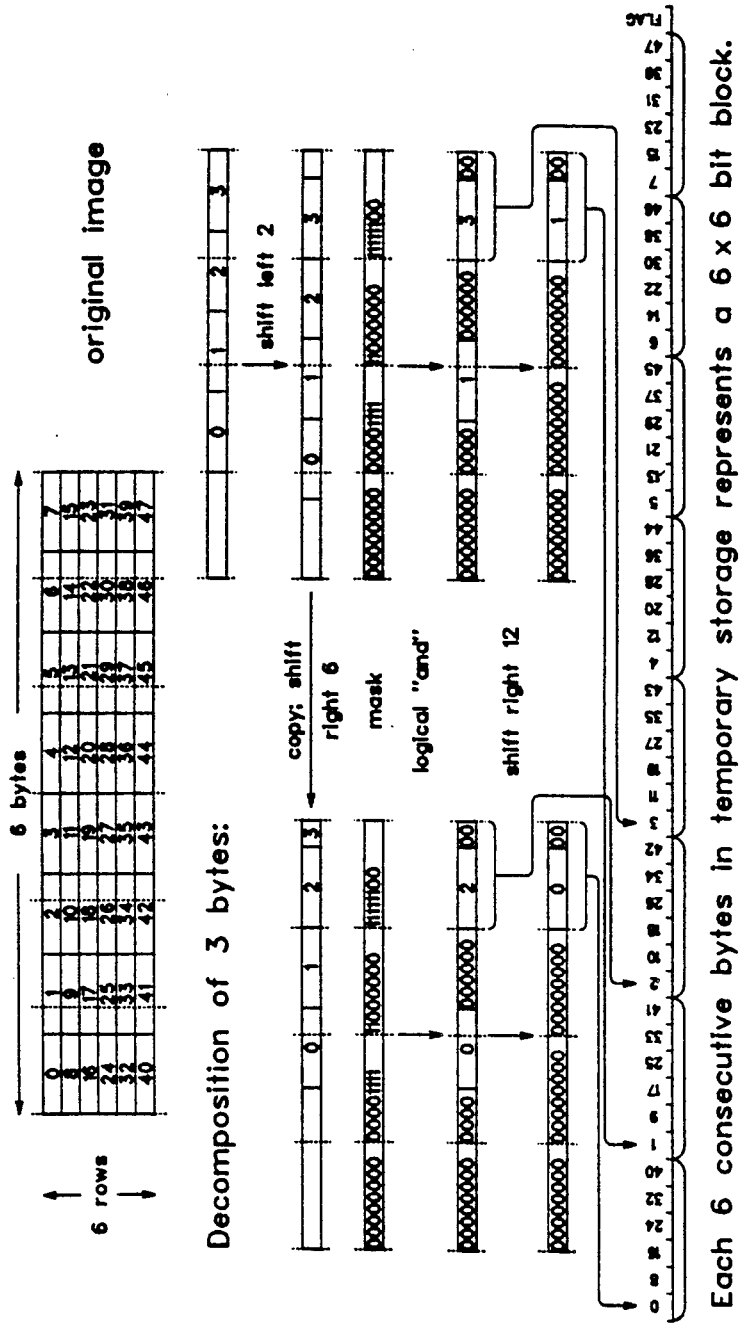
FIG. 1 is a diagram of a portion of the method according to the present invention.

The method according to the present invention reduces an image by one-sixth on both the horizontal and vertical axes. Images are considered to exist in storage reading from left to right across the rows, from the top of the image to the bottom. The compaction may be performed in situ, or the output may occupy storage which begins before the beginning of the original image or does not overlap the original image (so that no data from the original image can be overwritten with data from the output image before it is used).

The method has a standard Conversational Monitor System (CMS) interface with one explicit parameter, which is a pointer to a list of six parameters for the rotation. On entry, Register 0 points to the explicit parameter. Register 7 should be set up to point to a user-defined storage area which will be used as temporary storage. The size of this storage area should be 1950 bytes (at this time only 1892 bytes are actually used) plus 49 bytes for each six columns (or fraction thereof) in the original image (i.e. $1950+(49*/(c+5)6)$ bytes). The temporary storage area should begin on a 4 byte boundary or the program may run slower. Register 2 should be set to the same value as Register 7. The return code is returned in Register 15. All other registers will be restored to their original values on the return.

Four parameters which control the resolution change, plus two returned values, are stored in a 24-byte buffer, and a pointer to that buffer is passed to the program. All parameters are full four-byte words. FIXED(31) specifies a 4 byte value; PTR(31) indicates variables which will be addresses.

```
DCL
  PARM                    PTR(31),
  1 LIST BASED(PARM),
    2 INIMAGE             PTR(31),
    2 OUTIMAGE            PTR(31),
    2 IROWS               FIXED(31),
    2 ICOLS               FIXED(31),
    2 OROWS               FIXED(31),
    2 OCOLS               FIXED(31);
```

INIMAGE—Pointer to the first byte (i.e. the upper left-hand corner byte) of the original image.

OUTIMAGE—Pointer to the location where the first byte of the output image is to be stored.

IROWS—Number of lines in the original image.

ICOLS—Number of (byte) columns in the original image.

OROWS—On return from the subroutine, contains the number of lines in the output image.

OCOLS—On return from the subroutine, contains the number of (byte) columns in the output image.

The problem considered here is that of reducing the size of a binary image by 1/6 in both the horizontal and vertical dimensions. The reduction algorithm proposed uses a novel combination of techniques, including a fast reduction algorithm by table lookup for a six by six bit block and a new algorithm which exploits the fact that a binary image typically includes large areas containing only zero (white) picture elements to drastically reduce the amount of processing required, to produce code which is significantly faster than current methods. The bits making up the image are assumed to be stored packed eight to a byte. Since bit operations are computationally expensive, the image is divided into six by six bit blocks, with the data packed six bits to a byte in temporary storage. These blocks are reduced to five by five bit blocks (packed five bits to a byte) by a table lookup procedure; the reduced blocks are then recombined to complete the reduction process. The image reduction may take place in situ, or the output image may be constructed in an area of storage which begins before the start of the input image and/or does not overlap with the input image (so that no data from the input image can be overwritten with output image data before it is used).

The image reduction algorithm operates on six rows of the image at a time. The data is first repacked six bits to a byte to prepare it for these operations, as follows. An area of temporary storage containing 49 bytes for every six bytes (or fraction thereof) in a single row of the image is zeroed. The input image is divided into blocks 6 bytes (48 bits) across and six rows down, each of which will be transformed into a block five bytes across and five rows down. If the width of the image is not a multiple of six bytes, the image is padded on the right with zeroes; similarly, if the number of rows of image data is not evenly divisible by six, the image is padded at the bottom with zeroes. Each 36-byte block is decomposed into the temporary buffer, yielding a 49-byte unit which contains one byte for each 6-bit row of a six by six bit block (48 bytes) plus a flag byte which is set to zero unless there is nonzero data in the original 36-byte block. The decomposition is illustrated in FIG. 1. This operation makes use of 32-bit registers and processes three bytes at a time. Each three-byte unit is tested to determine whether it contains nonzero data. If it does not, no processing is needed, since the temporary buffer has been cleared; otherwise the flag byte is set to one and the indicated shifting and masking is performed to yield four 6-bit units, each shifted left by two bits for use in indexing the lookup tables.

The basic reduction operation takes a six by six bit block of the image and transforms it into a five by five bit image. The input image exists in a 49-byte unit of temporary storage, as arranged by the decomposition process described above. Each consecutive six bytes represents a six by six bit block. A set of lookup tables is used to convert each 6-bit row of image data to a five-bit column, transposing the image as well as reducing it. The operation is repeated to reduce the rows of the transposed image to five bits and retranspose to restore the original orientation of the block. The five-bit rows of the reduced image are stored left-justified in the first five bytes in the six-byte area of temporary storage from which the decomposed original image came.

The lookup tables used in the image reduction are constructed to preserve runs wherever possible. The rules for reducing a 6-bit row to five bits are as follows:
1. If the third pel can be removed without destroying a run,
   remove it; otherwise
2. If one run in the row is longer than all other runs,
   shorten
   that run by one bit; otherwise
3. If there are two two-bit runs, one of which is closer to the
   center of the row than the other, shorten the run closer to
   the center of the row by one bit; otherwise
4. If there are two two-bit runs, equally distant from the center
   of the row, shorten the white run (the two runs will be of
   opposite colors); otherwise
5. The only cases which remain are the alternating white/black
   and black/white (010101 and 101010). Remove the white pel
   nearest the center of the row.

Figure 2:
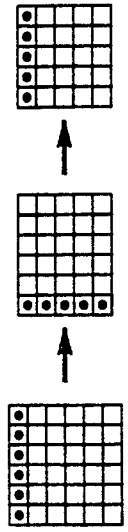
FIG. 2 is a diagram showing the reduction and transposition algorithms used with the method of the present invention.
Figure 2:
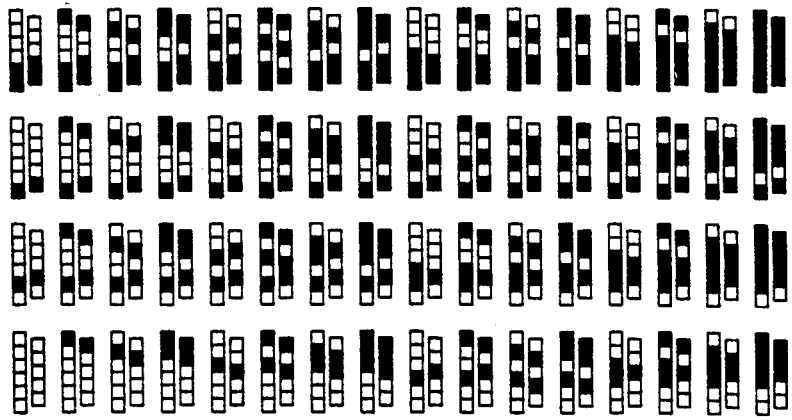

Note that if rule 3 is reached, the row contains no runs longer than two bits. The reduction of a 6-bit row is illustrated in FIG. 2. The entries in the first lookup table, in hexadecimal, are as follows:

| | | | |
|---|---|---|---|
| 00000000 | 00000004 | 00000100 | 00000104 |
| 00004000 | 00004004 | 00004100 | 00004104 |
| 00004000 | 00004004 | 00100100 | 00100104 |
| 00004000 | 00004004 | 00004100 | 00004104 |
| 00100000 | 00100004 | 00100100 | 00100104 |
| 00100100 | 00104004 | 00100100 | 00100104 |
| 00100000 | 00100004 | 00100100 | 00100104 |
| 00104000 | 00104004 | 00104100 | 00104104 |
| 04000000 | 04000004 | 04000100 | 04000104 |
| 04004000 | 04004004 | 04004100 | 04004104 |
| 04004000 | 04004004 | 04004100 | 04004004 |
| 04004000 | 04004004 | 04004100 | 04004104 |
| 04100000 | 04100004 | 04100100 | 04100104 |
| 04100100 | 04004004 | 04100100 | 04100104 |
| 04100000 | 04100004 | 04100100 | 04100104 |
| 04104000 | 04104004 | 04104100 | 04104104 |

The remaining five lookup tables are obtained by shifting these values left one bit for each successive table.

Figure 3:
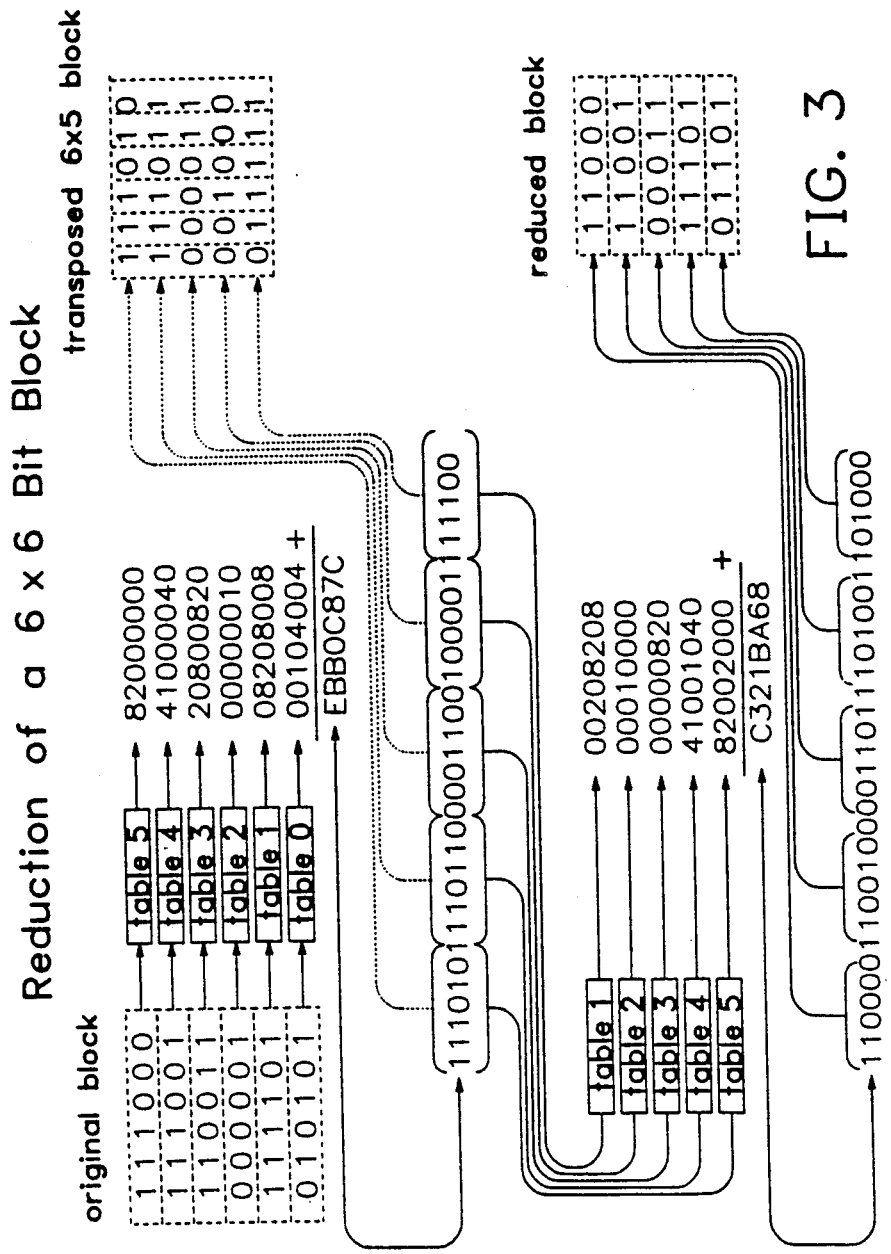
FIG. 3 is a diagram showing the method according to the present invention.

FIG. 3 shows an example of the operation of the reduction algorithm. The six 6-bit rows are used to index into the lookup tables, and the resulting values are summed. This produces a block six bits wide by five bits long, in which each row of the original block has been reduced to five bits and the block has been transposed. The operation is repeated, using the same lookup tables to reduce each row of the transposed block to five bits and retranspose, producing a five by five bit block.

Figure 4:
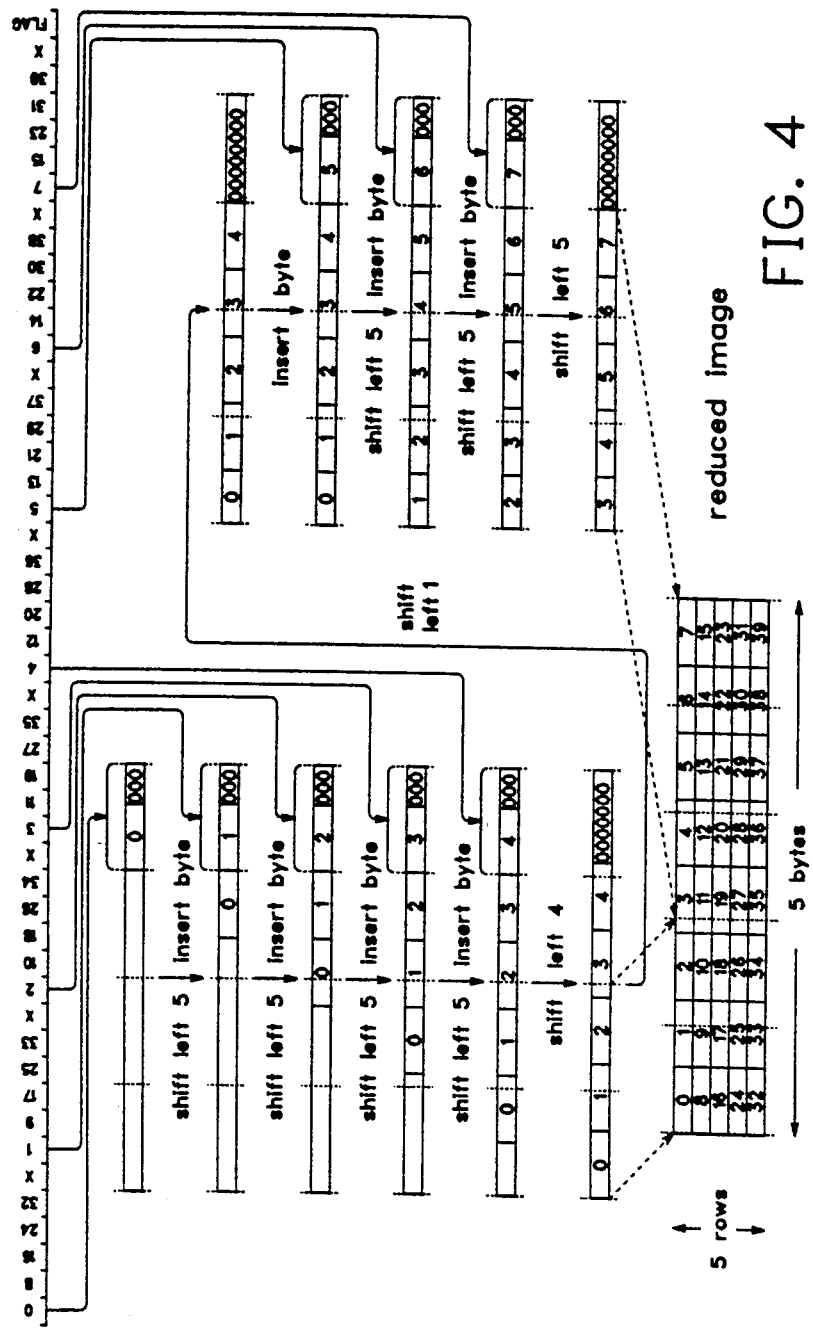
FIG. 4 is a flow diagram showing the recomposition of a reduced image in accordance with the present invention.

Finally, the section of the output image to be filled in is zeroed. The rows of the output image are recomposed from the five by five bit blocks stored in the temporary buffer and the output image is filled in. This operation is illustrated in FIG. 4. The implementation makes use of the 32-bit registers and the insert character, shift left logical, and store operations available on the IBM System/370.

For any 49-byte unit for which the flag byte is zero (i.e. the block contains no nonzero data), the reduction, reconstitution, and storage of the output image may be omitted (since an all-zero block reduced will contain all zeroes, and the output image has already been cleared). Since for typical images large portions of the image are white, and since the compaction and storage are the most time-consuming portions of the algorithm, this results in a significant increase in speed for most images over an algorithm in which this special case is not considered.

This function performs a resolution change of 240 to 200 pels (i.e. the output image has 5/6 the number of bits in each dimension as the input image). The input image contains "irows" and "icols" columns ("icols" is expressed in bytes) beginning at the address pointed to by "inimage". The reduced image is placed at the address pointed to by "outimage". The number of rows and (byte) columns in the reduced image are returned in the caller's parameter buffer as "orows" and "ocols".

"inimage" and "outimage" may point to the same address, or the input and output images may be so placed that either they do not overlap or, if they do, the first byte of the input image does not precede the first byte of the output image. This prevents any part of the input image being destroyed before it is processed.

The input image is processed in units of six lines. Each six-line unit is broken up into blocks six bytes wide, and the six bytes in each line are converted to eight bytes, each containing six bits of the original data. Successive 48-byte blocks are saved in temporary storage, along with a flag indicating whether the data in the block contains any nonzero bits. The data is reduced using lookup tables and saved into the temporary storage (replacing the unreduced data), and then reassembled and placed in the output image. The main loop processes a six-line unit; the first loop within it (referred to as the "input loop") collects the data from a group of six lines and moves it to temporary storage; and the second loop within the main loop (referred to as the "output loop") reduces the data and places it into the output image storage area. The output image is cleared before any data is moved into it. The output loop tests the flag for each 48-byte block to determine whether it contains any nonzero data; if it does not, no processing is necessary.

Thus, while the invention has been described with reference to preferred embodiments thereof, it will be understood by those skilled in the art that various changes in form and details may be made without departing from the scope of the invention.

What is claimed is:

1. A method for reducing the size of a binary image in a general-purpose computer comprising the steps of:
   storing said binary image in bit sequence in said computer
   dividing said image into transposable blocks of n×i bits
   transposing for each block, each string of n bits along a first axis to a string of m bits along a second axis where m is less than n;
   transposing for each transposed block, each string of i bits along said first axis to a string of j bits along said second axis, where j is less than or equal to i; and
   storing said transposed blocks.

2. A method according to claim 1 wherein said transposing steps are accomplished by table lookup.

3. A method according to claim 1 wherein n equals 6 and m equals 5.

4. A method according to claim 1 further comprising the step of testing each block for all bits of the same binary value.

5. A method according to claim 4 further comprising the step of omitting the transposing of each block having all bits of the same binary value.

6. A method according to claim 1 wherein n=i and m=j.

7. A method according to claim 2 wherein said table lookup for said block transposing step comprises:
   a first lookup table and i−1 successive lookup tables with each of said successive lookup tables having their values shifted successively left by one bit.

8. A method according to claim 2 wherein said table lookup for said transposed block transposing step comprises:
   a first lookup table and m−1 successive lookup tables with each of said successive lookup tables having their values shifted successively left by one bit.

9. A method according to claim 3 wherein said transposing of each string of n bits comprises the steps of:
   removing the third bit in said string if no run is destroyed thereby; otherwise,
   removing one bit from any run in a string longer than all the other runs; otherwise,
   if there are two two-bit runs not spaced equidistant from the center of the string, shortening the two-bit run closer to the center of the string by one bit; otherwise,
   if there are two two-bit runs of different color equidistant from said center, shortening the run of zero bits by one bit; otherwise,
   removing the zero bit nearest said center.

10. A computerized system for reducing the size of a binary image comprising:
    means for storing said binary image in bit sequence;
    means for dividing said image into transposable blocks of n×i bits;
    means for transposing in each block, a string of n bits along a first axis to a string of m bits along a second axis, where m is less than n;
    means for transposing for each transposed block, each string of i bits along said first axis to a string of j bits along said second axis, where j is less than or equal to i; and
    means for storing said transposed blocks.

11. A system as in claim 10 further comprising means for testing each block for all bits of the same binary value.

12. A system as in claim 11 further comprising means for omitting the transposition of each block having all bits of the same binary value.

13. A system as in claim 10 wherein both of said transposing means comprise a plurality of lookup tables.

14. A system as in claim 13 wherein said lookup tables for said block transposing means comprise:
    a first lookup table and i−1 successive lookup tables with each of said successive lookup tables having their values shifted successively left by one bit.

15. A system as in claim 13 wherin said lookup tables for said transposed block transposing means comprise:
    a first lookup table and m−1 successive lookup tables with each of said successive lookup tables having their values shifted successively left by one bit.

16. A method for reducing the size of a binary image in a general-purpose computer comprising the steps of:
    storing said binary image in bit sequence in said computer;
    dividing said image into transposable blocks of bits having i bits on one axis and n bits on the other axis;
    transposing each block by converting the string of n bits along said other axis to a string of m bits along said one axis, where m is less than n;
    transposing each transposed block by converting the string of m bits to said other axis; and
    storing said blocks after the foregoing transpositions.

17. A method as in claim 16, further comprising the step of:
    converting each string of i bits to a string of j bits during the transposition of each of said transposed blocks, where j is less than i.

18. A method as in claim 16, wherein blocks consisting of bits having all the same binary value are not transposed.

19. A method as in claim 16, wherein said transposing of each string of n bits comprises:
    removing bit n/2, where n/2=the nearest integer, in the string, if no run is destroyed thereby; otherwise,
    removing one bit from the longest run in the string, if there is one run that is longer than all the other runs; otherwise, shortening by one bit the run of maximum length closest to the center of the string, if such a run exists; otherwise, if there are two runs of maximum length and opposite color equidistant from the center of the string, shortening the run of zero bits by one bit.

20. A method according to claim 16, wherein said transposing steps are accomplished by table lookup comprising a first lookup table and the greater of $i-1$ and $m-1$ successive lookup tables with each of said successive lookup tables having their values shifted successively left by one bit.

* * * * *